United States Patent
Hubbes

(10) Patent No.: US 10,465,122 B2
(45) Date of Patent: Nov. 5, 2019

(54) METHOD FOR PROCESSING POLYMERIC WASTE

(71) Applicant: Hilmar Hubbes, Lage (DE)

(72) Inventor: Hilmar Hubbes, Lage (DE)

( * ) Notice: Subject to any disclaimer, the term of this patent is extended or adjusted under 35 U.S.C. 154(b) by 104 days.

(21) Appl. No.: 15/310,665

(22) PCT Filed: May 26, 2015

(86) PCT No.: PCT/DE2015/000257
§ 371 (c)(1),
(2) Date: Nov. 11, 2016

(87) PCT Pub. No.: WO2015/180704
PCT Pub. Date: Dec. 3, 2015

(65) Prior Publication Data
US 2017/0073583 A1    Mar. 16, 2017

(30) Foreign Application Priority Data

May 26, 2014    (DE) .................... 10 2014 007 595

(51) Int. Cl.
*C10B 53/07* (2006.01)
*C10B 47/06* (2006.01)
(Continued)

(52) U.S. Cl.
CPC ............ *C10B 53/07* (2013.01); *B09B 3/0083* (2013.01); *B29B 17/02* (2013.01); *C10B 47/06* (2013.01);
(Continued)

(58) Field of Classification Search
CPC ........... C10B 53/07; C10B 47/06; C10G 1/10; B29B 17/02; B09B 3/00
See application file for complete search history.

(56) References Cited

U.S. PATENT DOCUMENTS 3,068,812 A * 12/1962 Hemeon ............... F23G 5/10
110/190
4,401,513 A * 8/1983 Brewer ................. C10B 7/14
201/25

FOREIGN PATENT DOCUMENTS

CN    103 351 883    10/2013
DE    28 26 918      1/1980
(Continued)

OTHER PUBLICATIONS

Wuhr, M. (2008) Making the Right Choice What to Look Out for When you Choose a Heat Transfer Oil, Vogel Communications Group, 2 pgs. (Available at: https://www.process-worldwide.com/what-to-look-out-for-when-you-choose-a-heat-transfer-oil-a-301797/ ; Accessed: Jun. 13, 2018).*

*Primary Examiner* — Brain A McCaig
(74) *Attorney, Agent, or Firm* — Cozen O'Connor

(57) ABSTRACT

A method for the treatment of polymeric and/or organic waste using a heat-resistant process container provided with a valve and filled with prepared waste and which is closed in a gas-tight manner. The container is moved with the waste into a process furnace for thermal treatment. The waste is degassed therein via the valve during the thermal treatment, and immediately after degassing, the heated process container is moved from the process furnace into a cooling chamber in which the residual heat is removed from the process container and stored in a thermal storage. After cooling, the process container is removed from the cooling chamber and the contents of the process container are emptied into a separating device.

8 Claims, 3 Drawing Sheets

(51) Int. Cl.
  *C10B 47/18* (2006.01)
  *B29B 17/02* (2006.01)
  *B09B 3/00* (2006.01)
  *C10G 1/10* (2006.01)
  B29B 17/04 (2006.01)
  B29L 30/00 (2006.01)
  B29K 105/26 (2006.01)

(52) U.S. Cl.
  CPC ............... *C10B 47/18* (2013.01); *C10G 1/10* (2013.01); *B29B 17/0412* (2013.01); *B29B 2017/0496* (2013.01); *B29K 2105/26* (2013.01); *B29L 2030/00* (2013.01); *Y02P 20/143* (2015.11); *Y02W 30/622* (2015.05); *Y02W 30/625* (2015.05)

(56) References Cited

FOREIGN PATENT DOCUMENTS

| | | |
|---|---|---|
| DE | 697 08 140 | 7/2002 |
| DE | 101 50 696 | 5/2003 |
| DE | 103 48 987 | 5/2005 |
| DE | 698 25 069 | 8/2005 |
| DE | 10 2005 038 827 | 2/2007 |
| DE | 20 2013 105519 | 1/2014 |
| EP | 0 795 594 | 9/1997 |
| EP | 1 559 767 | 8/2005 |
| EP | 2 050 808 | 4/2009 |
| WO | WO 2009/103254 | 8/2009 |
| WO | WO 2010/012275 | 2/2010 |

\* cited by examiner

METHOD FOR PROCESSING POLYMERIC WASTE

CROSS REFERENCE TO RELATED APPLICATIONS

This is a U.S. national stage of application no. PCT/DE2015/000257, filed on May 26, 2015. Priority is claimed on German Application No. DE102014007595.8, filed May 26, 2014, the content of which is incorporated herein by reference.

BACKGROUND OF THE INVENTION

1. Field of the Invention

The invention is directed to a method for the treatment of polymeric and/or organic waste, particularly rubber waste and bamboo chips.

2. Description of the Prior Art

There is a variety of known methods for treating polymeric waste, particularly rubber waste, for example, from vehicle tires or from the rubber processing industry. A thermal treatment of the waste is carried out regularly after suitable processing, particularly cleaning and comminution. These thermal treatments vary to quite an extent. Thus DE 28 26 918 A1 suggests carrying out a thermal decomposition and partial gasification of the waste in a fluidized bed. DE 697 08 140 T2 and DE 698 25 069 T2 discuss pyrolysis methods. While DE 698 25 069 T2 discusses a self-contained process for disposal of rubber waste, it is complicated and the recovery of process energy through combustion, particularly of sulfur-containing gases, is not without problems. A similar method is known from DE 101 50 696 A1 in which the rubber waste is subjected to preheating before introducing it into a carbonization reactor. After heating, the carbonization reactor, including contents, is cooled gradually and must be heated anew for the next charge.

Comparable treatment processes are also known for organic waste. Thus DE 10 2005 038 827 A1 addresses a pyrolysis method for converting bamboo waste to artificial coal. This is followed by a comminution and rebinding of the coal with a binder. After heating again and after a carbonization of the coal, it can be used for adsorption purposes.

SUMMARY OF THE INVENTION

One aspect of the invention is a method for the treatment of polymeric and/or organic waste such as rubber waste and bamboo chips, which is advantageous with respect to energy but efficient and environmentally friendly.

In a first method step, a heat-resistant process container, which is provided with a valve and filled with suitably prepared waste, is closed in a gas-tight manner. The preparation of the rubber waste essentially consists of removing foreign matter, particularly rims in the case of automobile tires, or other obviously inappropriate material. Cleaning may also possibly be required. Particularly in the case of automobile tires, however, comminution is also provided for. A cutting press in which the pressing die is outfitted with knives has proven successful for the comminution.

This applies in a corresponding manner for organic waste. Accordingly, wood waste or bamboo waste is also to be comminuted and possibly dried and introduced into the process container as free from foreign matter as possible.

The waste processed in this way remains in the process container over the entire treatment process, and this process container must be suitably designed for thermal loading because in a second method step the process container with the waste is put into a process furnace for thermal treatment. The waste is degassed via the valve during the thermal treatment.

In contrast to conventional methods, a furnace or flame tube is not directly filled with the waste, this furnace or flame tube then having to be cooled and emptied after degassing. On the contrary, the degassed waste remains inside the process container for the subsequent method steps.

Immediately after degassing, which is indicated by sensors, for example, the process container is moved from the process furnace into a cooling chamber in which the residual heat of the process container and contents thereof are removed.

Accordingly, the process furnace is ready for a new charge immediately after moving the process container with degassed waste without needing to be cooled off.

The residual heat removed from the process container is stored in a thermal storage and is accordingly available as reusable process heat.

When the process container, including contents, is sufficiently cooled, the contents can be emptied into a separating device for further processing.

The gas removed during the heating via a conduit connected to the valve is cooled and intermediately stored in liquefied state in vessels for reuse. The oil resulting from cooling is a valuable basic material for the chemical industry in spite of the high proportion of sulfur.

It is further provided that the cooling chamber is formed with a plurality of pipes in the manner of a heat exchanger, that the pipes form at least one circuit for a thermal oil, and that the thermal storage is provided in the circuit of thermal oil. In particular, it is ensured that a plurality of circuits of different temperature levels are provided and process heat can then be suitably removed from the thermal storages.

There are two alternatives for moving the process container into the process furnace and out of the process furnace into the cooling chamber.

First, it can be provided that the process container has a connection on the front for pulling elements, that the process container is pulled by the pulling elements through a first gate into the process furnace, that after degassing the process container is pulled by pulling elements through a second gate opposite the first gate of the process furnace, through an opposite first gate into the cooling chamber, and that after cooling the process container is pulled by pulling elements through a second gate opposite the first gate of the cooling chamber.

While the process container can certainly be pulled on runners, process containers are advisably provided with rollers or wheels which possibly run in or on rails so that the process container is reliably prevented from swerving off to the side when pulled.

Alternatively, it is also possible that the process container has at least one connection on the top for lifting gear or a crane, that the process container is lifted by lifting gear or a crane through a first gate into the process furnace, that after degassing the process container is moved by lifting gear or a crane through a second gate opposite the first gate of the process furnace through an opposite first gate into the cooling chamber, and that after cooling the process container is moved by lifting gear or a crane through a second gate opposite the first gate of the cooling chamber.

An overhead crane can be used, for example, and a plurality of crane trolleys can move on the rail(s) thereof.

Regardless of the manner of charging the process furnace and cooling chamber, the gates located one behind the other are advantageous because the process is carried out inline, as it were, and therefore in one direction and accordingly, in spite of the discontinuous charging, a higher throughput can be achieved. This applies particularly when there are a plurality of pulling elements, lifting gear or cranes through which the process containers are moved simultaneously.

Further, as a result of these steps, the process furnace and/or cooling chamber can be operated continuously. Cooling of the process furnace in particular and a renewed heating is avoided in this way.

This is achieved as a result of the fast change or fast charging with process containers regardless of the manner of charging.

It is further advantageous to provide a connection arranged opposite a filling opening and at which lifting gear or crane can engage for emptying the process container into the separating device.

The separating device serves to separate the degassed and cooled waste. To this end, the separating device has a metal separator and sieves with different mesh sizes. The pieces of steel belt in automobile tires or the like, for example, are removed through the metal separators. Sieves of different mesh sizes provide degassed and cooled waste of different, predefinable sizes.

In particular, it is ensured that the smallest fraction is fed to a ball mill and that the ground material of the ball mill is supplied to a rolling mill via a sieve. In particular, a drum screen is used as sieve so that very fine-grained material with a particle size of 0.1 μm to 0.5 μm can ultimately be removed from the rolling mill.

BRIEF DESCRIPTION OF THE DRAWINGS

The essence of the invention will be described more fully with reference to the drawings in which the process flow is shown schematically and not to scale. The drawings show.

DETAILED DESCRIPTION OF THE PRESENTLY PREFERRED EMBODIMENTS

Figure 1:
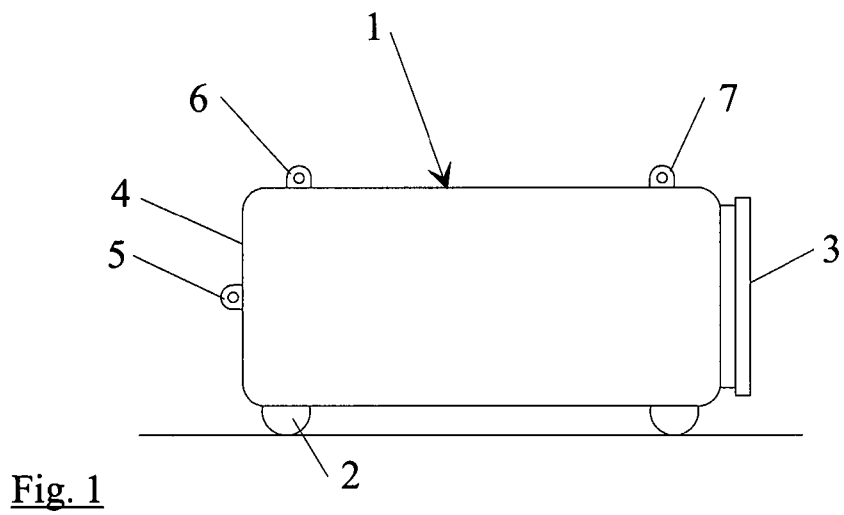
FIG. 1 is a side view of a process vessel.

The process container 1 shown in a side view in FIG. 1 is barrel-shaped and movable on wheels or rollers 2. A front side 3 is provided with a filling opening for the waste, which can be closed in a gas-tight manner. On side 4 opposite the front side 3 provided with the filling opening 3, an eye 5 is provided as a connection for pulling gear and a hook of a chain or steel cable can be hooked into this eye 5 for pulling or lifting for emptying the process container 1 through the filling opening.

Two further eyes 6, 7 are provided on the upper side of the process container 1 for loading the process container 1 with lifting gear or a crane.

Larger, approximately brick-sized chunks can be inserted into a process container 1 of this type to run through the process immediately.

Figure 2:
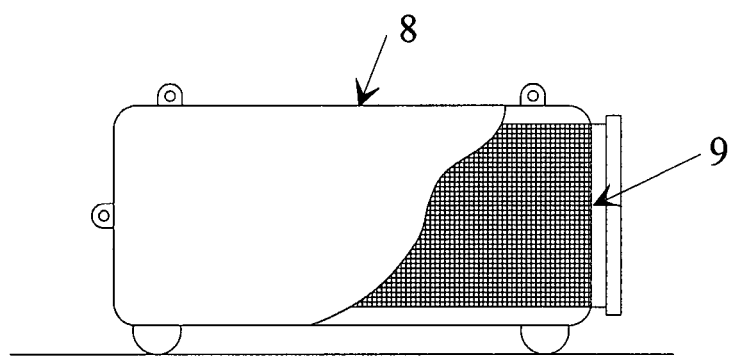
FIG. 2 is a process vessel, partially in section.

Less bulky material such as occurs, for example, in the rubber processing industry is put into process containers 8 (FIG. 2), which are provided with grate-like inserts 9 so that there is sufficient space remaining between the individual chunks of material for degassing.

Figure 3:
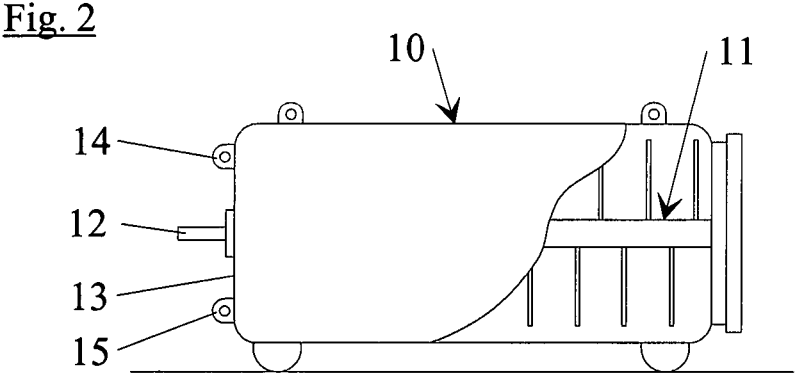
FIG. 3 is a process vessel, partially in section.

If the starting material is very fine, a process container 10 (FIG. 3) with a horizontal stirring apparatus 11 is used. A flange 12 is guided out on the front side 13 of the process container 10 opposite the filling opening for the drive of the stirring apparatus 11. The front side 13 further has two eyes 14, 15 for pulling or lifting the process container 10.

Regardless of the inner configuration, the process containers 1, 8 and 10 are substantially identical in construction and, in particular, heat-resistant so as to withstand the process to be described in the following without sustaining damage.

Figure 4:
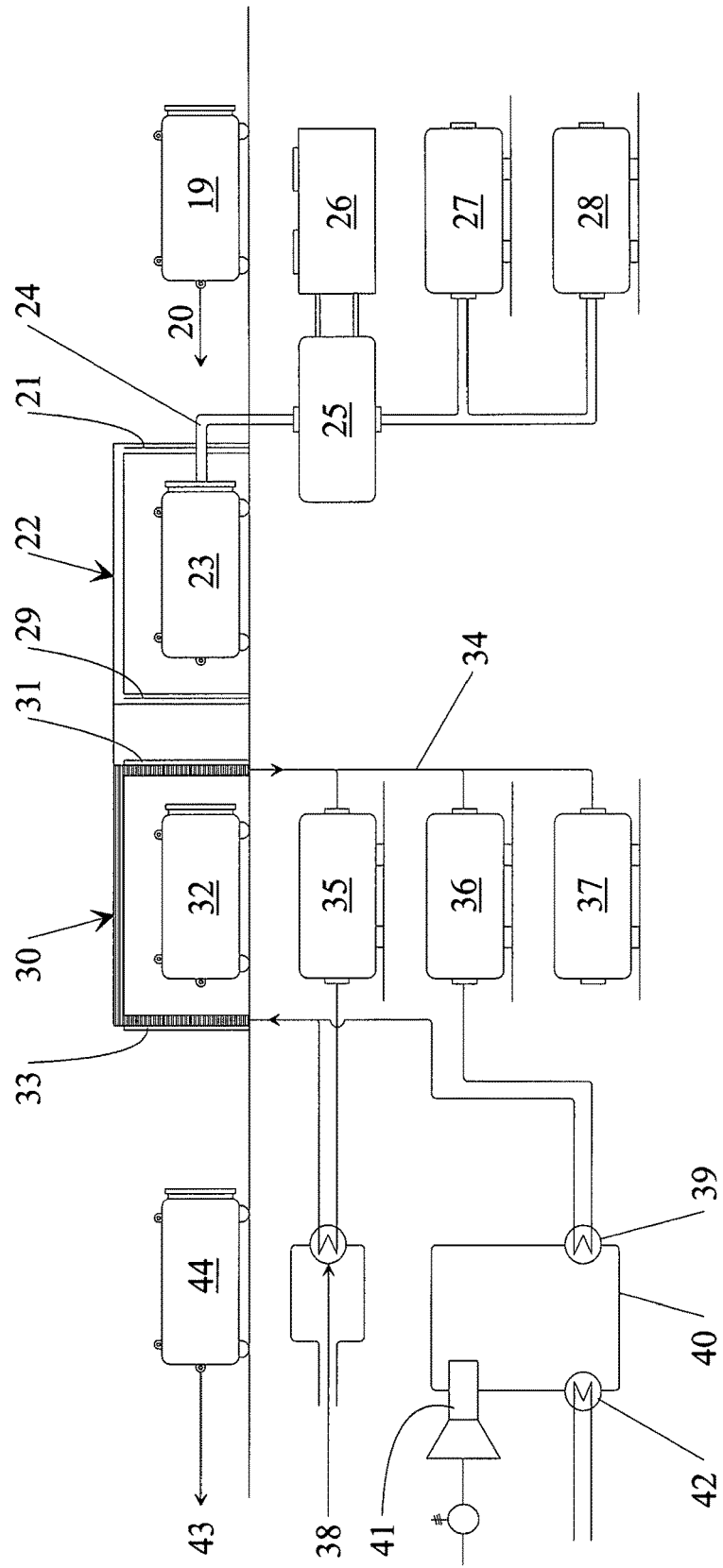
FIG. 4 serves to illustrate the thermal treatment and cooling of the rubber waste located in process vessels.

FIG. 4 shows a process container 19 being pulled through an indicated gate 21 into a process furnace 22 according to arrow 20 by pulling gear, not shown more fully, such as a chain or a steel cable. A degassing of the waste located in the process container 23 in the process furnace 22 is carried out in the latter at temperatures between 300° C. and 500° C. depending on the material to be degassed. To prevent the escape of environmentally harmful gases, the process container 23 has a valve, not shown in detail, to which a conduit 24 is connected. The output of conduit 24 is cooled in a vessel 25 by cooler 26 and liquefied, the sulfur-containing oil obtained in this way is collected, for example, in two tanks 27, 28 for subsequent further use.

Of course, conventional actuators and pumps or the like can be provided in the system of conduits 24, vessels 25 and tanks 27, 28.

When the degassing is concluded, which is detected by suitable sensors, a further gate 29 of the process furnace opposite gate 22 is opened and the process container 23 is disconnected from the conduit 24 and introduced into a cooling chamber 30. To this end, the cooling chamber 30 has a further gate 31 opposite the gate 29 of the process furnace 22.

The process furnace 22 can be heated continuously due to the fact that process containers 19, 23 and process container 32 located in the cooling chamber 30 are moved very fast, particularly also simultaneously, through a further gate 33 opposite gate 31 of the cooling chamber 30.

The cooling chamber 30 is constructed as a heat exchanger with a plurality of conduits indicated by shading. The conduits form, for example, three circuits 34 for thermal oil, which are shown in a simplified manner. Three thermal storages 35 to 37 which store the residual heat of the process container 31 at different temperature levels are provided inside the three circuits 35-37.

Thermal storage 35 can emit process heat of up to 120° C. via a heat exchanger 38 for heating the premises.

The second thermal storage 36 for temperatures between 120° C. and 300° C. supplies via a heat exchanger 39, in this case for example, a steam circuit 40 for operating a steam turbine 41 coupled with a generator and serves to generate power.

If required, more process heat can be extracted from the steam circuit 40 via a further heat exchanger 42.

With the heat of over 300° C., which is stored in the heat exchanger 37 in one embodiment, the two processes described above can be supported or the heat stored in this thermal storage 37 can be utilized, at least in a contributing role, for heating the process furnace 22.

When the process container 31 is sufficiently cooled, it is pulled through the gate 33 for emptying by pulling gear according to arrow 43 in process container 44.

Overall, the process for treatment is self-contained. Environmentally harmful emissions are not emitted into the environment. On the contrary, existing resources are utilized in an optimal manner, even with respect to power.

This is also true for the thermally treated waste itself as will be described in the following.

Figure 5:
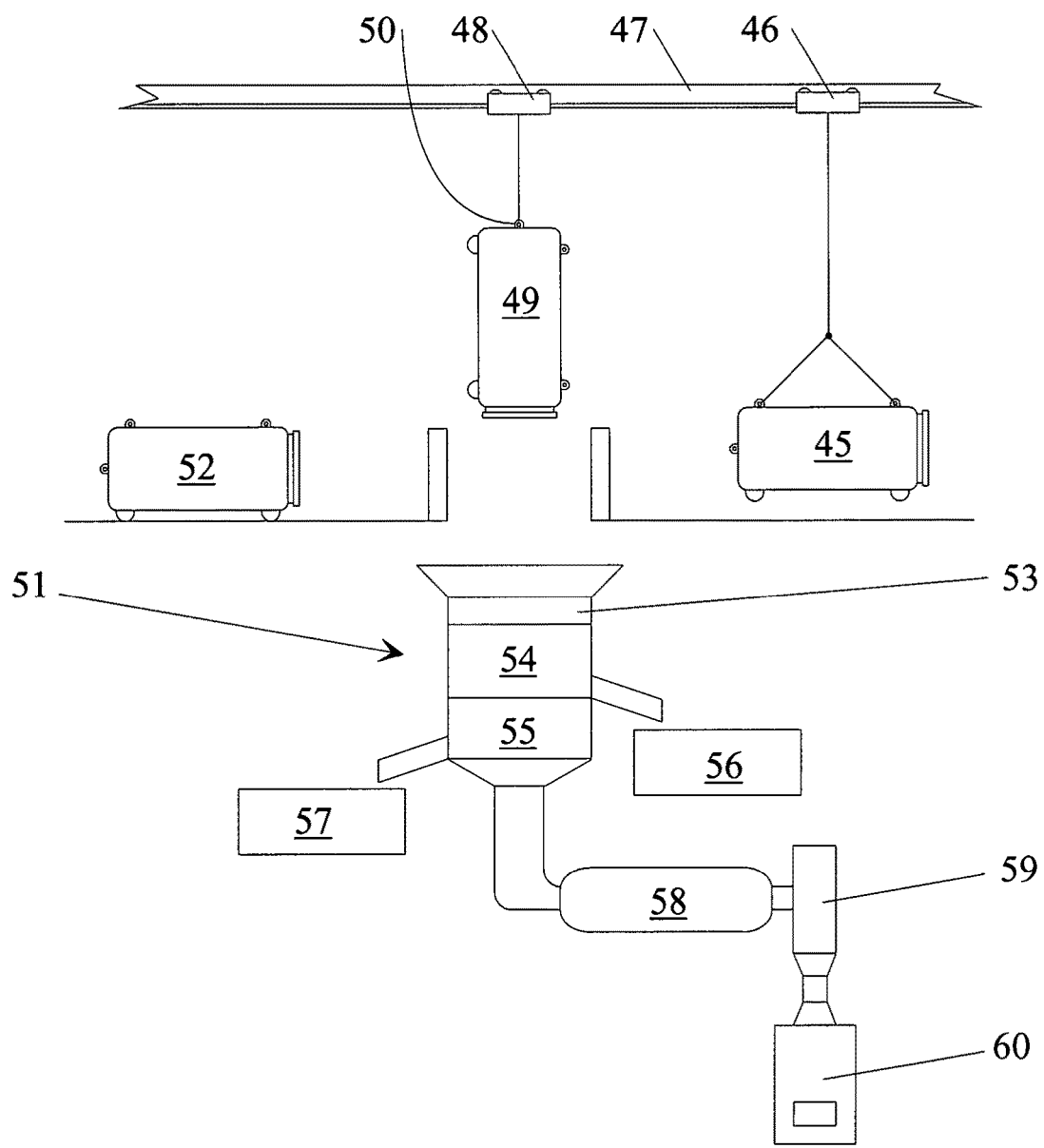
FIG. 5 serves to illustrate the processing of the degassed, cooled particles.

As an alternative to pulling gear, a process container 45 can be transported by a crane 46 or other lifting gear according to FIG. 5. In particular, crane trolleys, which are movable on rails 47, are also optimally suited for unloading a process container 49 as will be explained below.

Held by the crane 48 at a front eye 50, the process container 49 can be emptied easily through its filling opening 3 by gravity into a hopper or the like or, as is shown in FIG. 5, into a separating device 51.

When a process container 52 is emptied, it is available for a new process run.

The separating device 51, shown schematically has a metal separator 53 that removes metal foreign matter such as parts of a steel belt of an automobile tire, for example. In the embodiment example, the metal separator is followed by two sieves 54, 55.

Sieve 54 retains comparatively course parts of 3 cm$^3$ to 4 cm$^3$, which are collected in a collecting vessel 56 for subsequent reuse.

Owing to the process discussed above, activated charcoal obtained in this way can be further processed in an unobjectionable manner because no demonstrable toxic substances are contained as has been shown by studies using gas chromatography. The activated charcoal is very clean and of good quality with a very large surface structure.

Accordingly, without further treatment the activated charcoal collected in the collecting vessel 56 can be used, for example, in large filter plants for air treatment and in exhaust gas filtering, for example, in welding installations. Further, the material absorbs odors efficiently and is very absorbent so that it can also be used, for example, in the field of printing technology with biological dyes to absorb the very strong odors.

Charcoal chunks of 1 cm$^3$ to 2 cm$^3$ are sorted out through the second sieve 55 and are fed to a further collecting vessel 57. This finer material is optimally suited for using in relatively small filters for air treatment, for example, in large offices, waiting rooms of medical practices or the like. Bodily exhalations are also optimally absorbed by the material.

The very fine fraction passing through the sieves 54, 55 is fed to a ball mill 58 and can be ground to a powder of between 5 µm and 10 µm depending on the intended use. FIG. 5 shows, again schematically, a drum screen 59 which passes, for example, a finely ground powder with a grain size of 5 µm and returns larger particles to the ball mill 58.

Even finer material is obtained when the material exiting from the drum screen 59 is further fed to a rolling mill 60. The particle size after passing through the rolling mill 60 amounts to between 0.1 µm and 0.5 µm.

A powder with a particle side of 10 µm can be used as filler for the manufacture of plastic. A powder with a grain size of less than 5 µm can be used again in rubber production. Kneaded into a raw rubber mass, this material fills the same purpose as soot and, beyond this, has a better absorption.

Further, a fine powder can be used as pigment in the dye industry. The fine material from the rolling mill 60 can also be more finely ground in a wet mill if required.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for treatment of polymeric and/or organic waste, comprising:
    providing a heat-resistant process container having a valve;
    filling the heat-resistant process container with suitably prepared waste in at least one grate-like insert;
    closing the heat-resistant process container in a gas-tight manner;
    putting the heat-resistant process container with the waste into a process furnace for thermal treatment;
    removing the gas via a conduit connected to the valve;
    cooling a gas and intermediately storing the gas in a completely liquefied state in tanks for subsequent use;
    degassing the waste via the valve during the thermal treatment;
    moving the heated heat-resistant process container from the process furnace into a cooling chamber in which heat is removed from the heat-resistant process container, immediately after degassing;
    storing the heat in a thermal storage;
    removing the heat-resistant process container from the cooling chamber after cooling; and
    emptying the heat-resistant process container into a separating device.

2. The method according to claim 1, wherein
    the cooling chamber is provided with a plurality of pipes to be constructed as a heat exchanger,
    the plurality of pipes forming at least one circuit for a thermal oil, and
    the thermal storage is provided in the at least one circuit of the thermal oil.

3. The method according to claim 2, wherein process heat is removed from the thermal storage.

4. The method according to claim 1, wherein
    the heat-resistant process container has a connection on a front for pulling gear,
    the heat-resistant process container is pulled by the pulling gear:
        through a first gate into the process furnace,
        through a second gate of the process furnace opposite the first gate after degassing,
        through a cooling chamber first gate, opposite the process furnace first gate, into the cooling chamber, and through a second gate of the cooling chamber opposite the cooling chamber first gate after cooling.

5. The method according to claim 1, wherein the heat-resistant process container has at least one connection on a top for lifting gear, the heat-resistant process container being lifted by the lifting gear:
through a first gate into the process furnace,
through a second gate of the process furnace opposite the first gate after degassing,
through an opposite first gate into the cooling chamber, and
through a second gate of the cooling chamber opposite the first gate after cooling.

6. The method according to claim 1, wherein at least one of the process furnace and the cooling chamber is operated continuously.

7. The method according to claim 1, wherein lifting gear acts at a connection arranged opposite a filling opening for lifting and subsequently emptying the heat-resistant process container.

8. The method according to claim 1, wherein the separating device has a metal separator and sieves with different mesh sizes, wherein a smallest fraction is fed to a ball mill, and ground material of the ball mill is supplied to a rolling mill via a sieve.

* * * * *